United States Patent
Frouin et al.

(10) Patent No.: US 7,151,752 B2
(45) Date of Patent: Dec. 19, 2006

(54) METHOD FOR THE BROADCASTING OF A DATA PACKET WITHIN A SWITCHED NETWORK BASED ON AN OPTIMIZED CALCULATION OF THE SPANNING TREE

(75) Inventors: Laurent Frouin, Rennes (FR); Falk Tannhauser, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 1026 days.

(21) Appl. No.: 10/133,677

(22) Filed: Apr. 29, 2002

(65) Prior Publication Data

US 2002/0196745 A1 Dec. 26, 2002

(30) Foreign Application Priority Data

May 2, 2001 (FR) .................................. 01 05888

(51) Int. Cl.
*H04L 12/28* (2006.01)
(52) U.S. Cl. ........................................... 370/256
(58) Field of Classification Search ........ 370/254–258, 370/351, 357, 389, 400, 390
See application file for complete search history.

(56) References Cited

U.S. PATENT DOCUMENTS 5,088,091 A * 2/1992 Schroeder et al. .......... 370/406
6,154,463 A * 11/2000 Aggarwal et al. .......... 370/408
6,480,502 B1 * 11/2002 Abadi et al. ............... 370/432
6,865,160 B1 * 3/2005 Bare .......................... 370/256
6,947,434 B1 * 9/2005 Hundscheidt et al. ...... 370/401
2002/0146008 A1 * 10/2002 Kaplan ...................... 370/390

OTHER PUBLICATIONS

A. Fujii, et al., "Design Of A Multicast Routing Algorithm", Performance, Computing And Communications, 1998. IPCC '98., IEEE International, Tempe/Phoenix, AZ, USA. Feb. 16-18, 1998, pp. 442-447.
D. Bertsekas, et al., "Data Networks", 2$^{nd}$ Edition, Prentice Hall International, 1992, pp. 390-393.

* cited by examiner

*Primary Examiner*—Dmitry Levitan
(74) *Attorney, Agent, or Firm*—Fitzpatrick, Cella, Harper & Scinto

(57) ABSTRACT

Disclosed is a method for the broadcasting of a data packet, called a broadcast packet, within a switched network comprising a plurality of nodes connected to one another by a plurality of links, said broadcast packet being broadcast along a spanning tree of the network. Each node is of the type used to send said broadcast packets simultaneously on several links. The method comprises a step for the calculation of said spanning tree that consists in minimizing the number of links per node included in said spanning tree.

12 Claims, 5 Drawing Sheets

METHOD FOR THE BROADCASTING OF A DATA PACKET WITHIN A SWITCHED NETWORK BASED ON AN OPTIMIZED CALCULATION OF THE SPANNING TREE

BACKGROUND OF THE INVENTION

1. Field of the Invention

The field of the invention is that of switched networks comprising a plurality of nodes connected by a plurality of physical communications links. These links generally provide for two-way data transfers, for example according to the IEEE 1355 standard.

More specifically, the present invention relates to the broadcasting of digital data packets, known as broadcast packets, within a switched network of this kind.

The invention can be applied especially but not exclusively to a high bit rate switched network comprising a small number of nodes used for the real-time exchange of moving pictures, for example for distribution within a dwelling.

Conventionally, each node of a switched network comprises a switch apparatus (sometimes also called a switch device hereinafter in the description) and a data-processing apparatus. The switch apparatus itself has a data packet routing device and an interface device between the routing means and the links.

Two types of data packets are generally distinguished. These are unicast packets and broadcast packets.

Whatever their type, data packets have a predetermined format comprising for example a routing header, a payload (containing useful data) and an end-of-packet or end-of-message indicator. A message consists of at least two packets or only one packet (in the latter case, the end-of-message indicator is used).

The path that a packet must take to reach its destination is determined by the sender (the routing is done at the source). This path is indicated in the header of the packet and is used by the intermediate nodes to determine the link along which the packet should be sent. It may be recalled that each packet that is conveyed by a link connected to a node reaches an input port of this node and is switched to an output port of this node from where it goes out again, being conveyed by the above-mentioned link or another link.

A broadcast packet is distinguished from a unicast packet by the fact that its header has a broadcast packet indicator indicating that it has to be sent to each of the nodes of the network.

Conventionally, the broadcast packets are broadcast along a spanning tree of the network. This tree is computed as a function of the topology of the network. This tree defines those links, among all the links forming the mesh of the network, that have to be used for the broadcasting of a broadcast packet from a source node to all the other nodes of the network. Indeed, each node that receives the broadcast packet must send it to one or more other nodes respectively through one or more links belong to the spanning tree.

2. Description of the Prior Art

There are mainly two known techniques by which a node can send a broadcast packet on several links of the spanning tree to several other nodes.

The first known technique consists of the duplication of the broadcast packet within the network into as many copies as there are links concerned by the broadcast at output of this node. In this way, the broadcast packet is sent independently (and therefore not simultaneously) on each of the links concerned.

Unfortunately, owing to the packet duplication mechanism that it requires, this first approach is very costly, at each node, in terms of processing and memory resources.

A second known technique has therefore been proposed. In this technique, the node sends the broadcast packet simultaneously on all the concerned links of the spanning tree. Thus, the costly implementation of the mechanism of duplicating packets within the node is avoided.

Hereinafter in the description, it is assumed that each node of the switched network is of the type implementing this second known technique (the sending of one and the same broadcast packet simultaneously on several links).

Traditionally, the spanning tree calculation techniques rely on an approach seeking to minimize the total "cost" of the links belonging to this tree. The term "cost of a link" is understood to mean especially the relative occupancy rate (or load rate) of this link with unicast traffic. The algorithms implemented in these standard spanning tree calculation techniques are well known to those skilled in the art and are, for example, described in the following document: Dimitri Bertsekas, Robert Gallager, "Data Networks", 2nd Edition, Prentice-Hall International, 1992, ISBN 0-13-201674-5 (pages 390–393).

These conventional spanning tree calculation techniques turn out to have several drawbacks when each node of the switched network is of the type implementing the second known technique mentioned here above.

Indeed, when a node has to simultaneously send a broadcast packet on several links belonging to the spanning tree, it may happen that all these links are not simultaneously free. In other words, in the node, the output ports connected to certain links are not available. For example, one or more links may be in the course of being used for the sending of unicast packets. In this situation, the broadcast packet is blocked until all the links concerned by the broadcast become simultaneously free. The major drawback of this blocking is that it leads to an increase in the mean latency of broadcasting of a broadcast packet within the network.

Since they are optimized solely in terms of total load of the links, the conventional spanning tree calculation techniques do not take account of this problem of broadcasting congestion of the network.

It is an object of the invention especially to overcome this major drawback of the prior art.

More specifically, one of the goals of the present invention is to provide a method for the broadcasting of data packets, used to limit the mean latency of broadcast of a broadcast packet within the switched network.

It is also a goal of the invention to provide a method of this kind that is simple to implement and costs little.

SUMMARY OF THE INVENTION

These various goals as well as others that can appear hereinafter are achieved according to the invention by means of a method for the broadcasting of a broadcast packet, within a switched network comprising a plurality of nodes connected to one another by a plurality of links, said broadcast packet being broadcast along a spanning tree of the network. According to the invention, each node is of the type used to send said broadcast packets simultaneously on several links, and the method comprises a step for the calculation of said spanning tree that consists in minimizing the number of links per node included in said spanning tree.

The general principle of the invention therefore consists of the broadcasting of broadcast packets along a spanning tree having the smallest possible number of links for each node.

In this way, the probability that, in each node, all the links concerned by the broadcasting (and therefore all the corresponding output ports of the node) will be simultaneously free is increased. Consequently, the mean latency time of broadcasting of a broadcast packet within the network is reduced. In other words, the invention limits the problems of broadcasting congestion of the network.

It will be noted that, in most cases, the spanning tree computed according to the present invention (as a function of the criterion of minimization of the number of links per node) has a total "cost" of links (for example the total load rate of the tree) that is higher than that of a spanning tree computed according to the standard calculation technique which precisely seeks to minimize this total "cost" of the links belonging to the tree. However, this is largely compensated for by the advantage procured by the invention in terms of reduction of the mean time of broadcasting of a broadcast packet.

It will also be noted that the present invention can advantageously be applied to a switched network conveying unicast packets and broadcast packets, wherein each node implements a cut-through switch type of algorithm (see detailed description here below with reference to the figures). It may be recalled that, with this type of cut-through switch algorithm, the processing time of a packet is reduced because its routing starts as soon as the header of the packet is received. In other words, the combination of this type of cut-through switch algorithm with the spanning tree calculation algorithm according to the invention further reduces the mean latency time of broadcasting of a packet.

Preferably, if the topology of the network allows it, said step for calculating the spanning tree consists of the calculation of a linear spanning tree in which there are at most two links connected to each node.

Thus, in the ideal case of a linear tree, an intermediate node which receives a broadcast packet needs to send it on only one link (namely to only one other node) since it does not send it back to the node that has just sent it).

Advantageously, said switched network is of the type comprising N nodes and L links, wherein said spanning tree calculation step itself comprises the following steps:
 the generation of a plurality of possible spanning trees for said switched network;
 the comparison of said possible spanning trees two by two, depending on at least one predetermined comparison criterion linked to the minimizing of the number of links per node belonging to the spanning tree, so as to determine the best spanning tree among said plurality of possible spanning trees.

Advantageously, said steps of generation and comparison cover all the possible spanning trees.

This procedure is particularly well suited to a local area network comprising a small number of nodes since, in this case, the quantity of computations to be performed is quite acceptable. This is especially the case of a small home area network.

In a particular embodiment of the invention, the comparison of two spanning trees comprises the following steps:
 (a) the number of nodes connected to p links for one of the two trees is compared with the number of nodes connected to p links for the other of the two trees, with p being the predetermined maximum number of links per node for said switched network;
 (b) if one of the two spanning trees has fewer nodes connected to p links, it is defined as the best of the two spanning trees;
 (c) if the two spanning trees have the same number of nodes connected to p links, a complementary processing operation is applied.

Preferably, said complementary processing consists of the decrementing of p by one unit and then:
 if p>2, the steps (a), (b) and (c) are reiterated with the value decremented by p;
 else, the two trees are compared according to at least one other predetermined comparison criterion, not related to the minimizing of the number of links per node belonging to the spanning tree.

Advantageously, said at least one other predetermined comparison criterion, not linked to the minimizing of the number of links per node, is the total load of the links belonging to the tree.

Preferably, said network is a local area network. Thus, the complexity of the optimized calculation of the spanning tree is reduced.

Advantageously, said step for the calculation of the spanning tree is performed dynamically only after each modification of the topology of the network.

The topology of the network is modified for example when the user adds or eliminates a node or a link, or in the event of a failure in a node or a link. Thus, the user can modify the topology as he wishes, without having to perform any action so that the spanning tree is updated and remains optimal.

The invention also relates to a data packet switch apparatus, of the type contained in a node and capable of participating in the implementation of a method for the broadcasting of a data packet, known as a broadcast packet, within a switched network comprising a plurality of nodes connected to one another by a plurality of links, said broadcast packet being broadcast along a spanning tree of the network. According to the invention, said switch apparatus comprises:
 means for the sending of said broadcast packet simultaneously on several links;
 means for the calculation of said spanning tree, by the minimizing of the number of links per node included in said spanning tree;
 means for the parametrization of said switch apparatus as a function of said spanning tree, so as to memorize those links, among the links connected to the switch apparatus, which have to be used during the broadcasting of a packet.

Advantageoulsy, said data packet switch apparatus comprises means for storing data packets to be broadcasted, the means for storing data packets being a single Fifo.

In an advantageously way, said data packet apparatus comprises means enabling the transfer of packets contained in the means for storing simultaneously to output Fifo.

As an advantageous variant, said data packet switch apparatus comprises means for storing data packets to be broadcasted, the means for storing data packets being of Fifo type.

Advantageously, the means for storing are connected to two internal buses through 3 state registers, thus authorizing simultaneous transfer of data to internal Fifo and to output Fifo.

The invention also relates to a computer program comprising sequences of instructions adapted to the implementation of a method of the kind of mentioned here above, when said program is executed on a computer.

The invention also relates to a computer program product adapted to the broadcasting of a data packet, known as a broadcast packet, within a switched network comprising a plurality of nodes connected to one another by a plurality of links, said broadcast packet being broadcast along a spanning tree of the network, each node being of the type used to send said broadcast packet simultaneously on several links, said computer program product comprising program code instructions recorded on a medium that can be used in a computer comprising:

programming means readable by computer to perform a step for the calculation of said spanning tree, consisting of the minimizing of the number of links per node included in said spanning tree.

BRIEF DESCRIPTION OF THE DRAWINGS

Other features and advantages of the invention shall appear from the following description of a preferred embodiment of the invention, given by way of a non-restrictive exemplary indication, and from the appended drawings, of which.

MORE DETAILED DESCRIPTION

Figure 1:
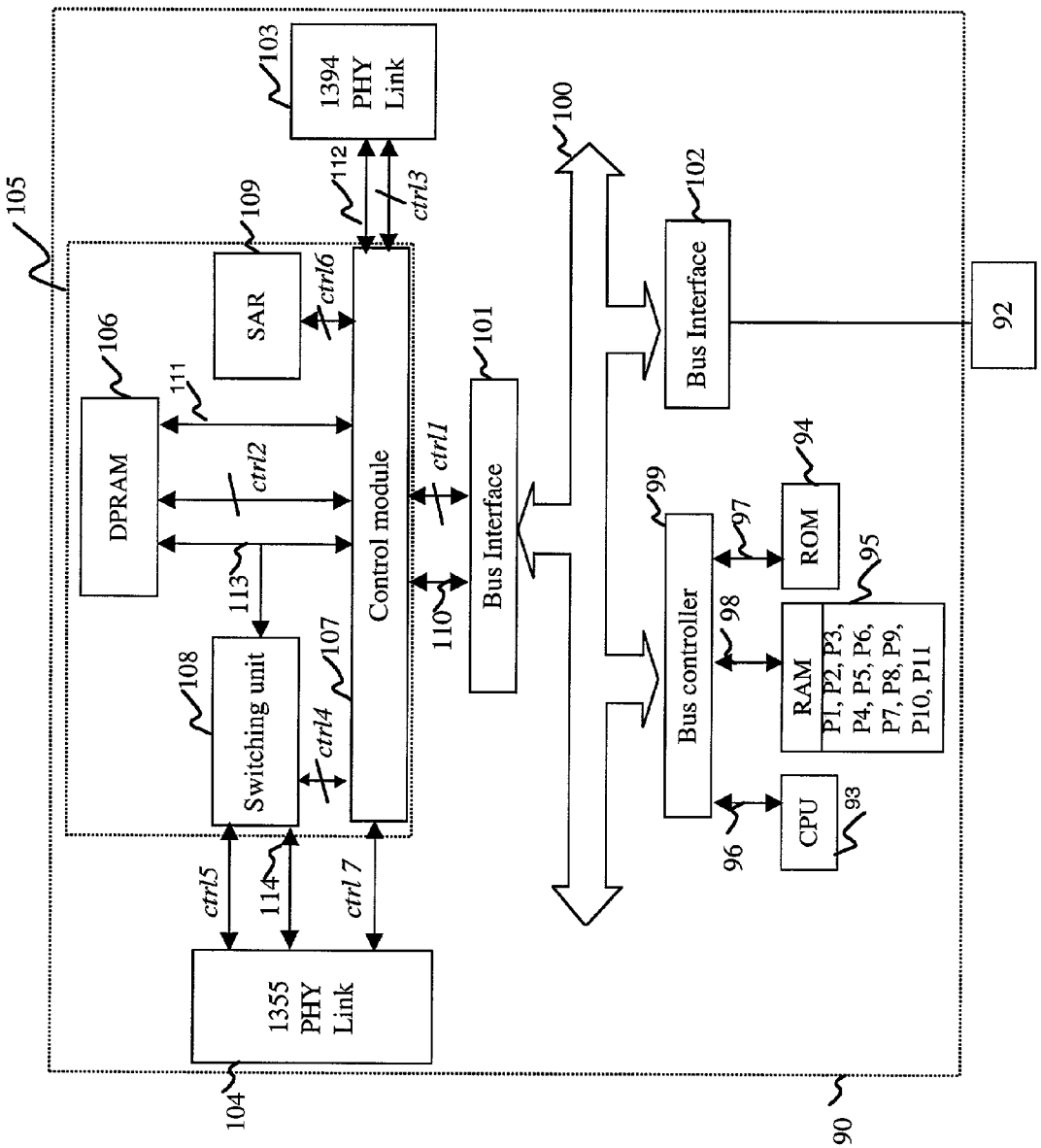
FIG. 1 is the block diagram of a switch (or switch apparatus) according to the invention according to a particular embodiment of the invention.

The invention can be applied in many fields, and can be applied especially in the context of:

high bit rate switching;

distributed applications;

the transmission and/or reception of digital data;

audio applications;

company networks, and real-time image transmission.

A preferred field of application of the invention is that of domestic applications for high bit rate transfers. Here below, we shall describe an exemplary system implementing the invention, used to interconnect a plurality of audio and video devices in the home.

The standards IEEE 1394 and the IEEE 1355 are respectively adapted to serial communications and to unicast communications.

The system presented here below in the document is a switched bit rate federating network used to achieve high transmission capacities (typically in the range of one Gbit) and meeting the major requirement of the interfacing of the two types of standards referred to here above.

The general principle of the invention relies on the implementation of:

an exchange protocol; and an arbitration matrix in a switch module capable of receiving and sending data from several sources, especially through IEEE 1394 and/or IEEE 1355 type interfaces.

The IEEE 1355 type interface has several pairs of input/output ports, a pair of FIFOs being associated with each pair of ports.

The IEEE 1394 type interface comprises a DPRAM memory used for the storage of the data coming from and/or addressed to an IEEE 1394 bus.

This DPRAM can also be used for the transfer of data coming from and/or addressed to other communications interfaces.

The switch module, having its architecture organized around two TDM type data buses (one in reception and the other in transmission), comprises especially:

the arbitration matrix;

three-state registers driven by signals generated by the arbitration matrix and used for the reading and/or writing of data on the two data buses;

input FIFOs used for the reception of data coming from a FIFO associated with an IEEE 1355 reception port;

output FIFOs used for data addressed to the DPRAM for interfacing with the IEEE 1394 bus; and internal FIFOs used for the data coming from the DPRAM for interfacing with the IEEE 1394 bus.

The FIFOs are preferably of the dual port memory type and can thus be accessed simultaneously in read and write mode on two distinct ports.

The data addressed to an IEEE 1355 transmission port are sent directly to the FIFO associated with this port through the data transmission bus.

According to the data exchange protocols, the operations for the transfer of data between an input or internal FIFO and one or more output FIFOs and/or 1355 ports can be done only in the context of a connection made at the level of the packets. Thus, for a connection to be open, following a request from an input FIFO or an internal FIFO, the addressee FIFO or each of the addressee FIFOs should enable the opening of one connection. Thus, the addressee FIFOs are never saturated.

The arbitration matrix consists of rows and columns.

Each of the columns is associated with an input port and is in charge of the management of the reception of data coming from this input port.

Each of the rows is associated with an output port and is in charge of the management of data intended for this output port.

Naturally, the roles of the rows and of the columns may be exchanged.

The matrix is built in such a way that, at a given point in time, only one crosspoint of each row enables one connection.

In general, the write access to the buses is obtained by means of three-state registers controlled by signals coming from the arbitration matrix.

Furthermore, the arbitration matrix generates control signals for the FIFOs in write mode.

Thus, in short, the arbitration matrix manages connections between input ports and output ports in preventing conflicts and managing the aspects linked to synchronization. This enables the arbitration matrix to generate control signals for access (in write or read mode) to the transmission and reception buses.

FIG. 1 shows a diagrammatic view of a switching node 90 connected to two serial communications buses conforming to the IEEE 1394 and IEEE 1355 standards.

The node shown in FIG. 1 is also connected to one or more other switching nodes of the switched network to which it belongs.

In the embodiment shown in FIG. 1, it has been chosen to represent a data-processing apparatus 92 also called a peripheral which is associated with the switch device 90.

A switching node comprises:
a switch device 90;
a data-processing apparatus 92 associated with said switch device.

As a variant, the data-processing apparatus may itself constitute or include the switch device 90.

The device 90 comprises:
a central processing unit CPU 93;
a ROM-type permanent storage means 94; and
a RAM-type temporary storage means 95 associated with the central processing unit 93, a software architecture being loaded into the means 95 at initialization.

The storage means 95 is able to store data packets of different types, especially:
asynchronous packets of the type conforming to the IEEE 1394 standard,
packets constituting messages in non-connected mode (asynchronous messages), of the type conforming to the IEEE 1355 standard,
control packets of the type conforming to the IEEE 1355 standard.
stream (isochronous) packets of the type conforming to the IEEE 1355 standard.

The type of packets conforming to the IEEE 1355 standard really exist in the component 104 which will be mentioned later, but they are not stored in this form in the RAM storage means 95. It should be noted that the storage means 95 contain the information necessary to generate the IEEE 1355 packets.

The routing of such packets up to the storage means 95, coming either from the 1394 bus or from the switched network constituted by IEEE 1355 links, will be described in detail later.

The routing of such packets from the storage means 95 until they are transmitted by the switching node, either to the IEEE 1394 bus or to the switched network consisting of IEEE 1355 links, shall be described in detail later.

These three elements 93, 94 and 95 communicate by means of respective data and address buses referenced 96, 97 and 98, with a block referenced 99 and known to those skilled in the as a bus controller.

This block 99 is especially used to exchange data by means of a main bus 100 with at least one bus interface component 101. Should the bus 100 be a PCI ("Peripheral Component Interconnect") standard bus, the component 101 may be a component referenced AMCC 5933QC, commercially distributed by the company Applied Micro-Circuits Corporation (registered mark).

The bus 100 may also interconnect other elements, not shown in FIG. 1, to one another. These elements are themselves provided with a bus interface and are capable, for example, of implementing data-processing functions.

For example, should the bus 100 be a PCI-standard bus, the block 99 is actually a set of PCI components such as the Intel 440LX AGP set, commercially distributed by the INTEL Company.

Thus, the block 99 comprises, for example, an 82443LX component which provides the interface with the memory 95 via the memory bus 98 and with the central processing unit CPU 93 via the local bus 96. The 82443LX component is itself linked to an 82371AB component which provides an interface with the ISA bus 97 linked to the memory 94. An Intel 82093AA IOAPIC interrupt controller connected to the central processing unit CPU 93 manages the interrupts that may occur in the system.

As shown in FIG. 1, the device 90 also includes a bus interface 102 which may be similar to the bus interface 101, thus allowing the data-processing apparatus or peripheral 92 to access the switch device.

Such an interface is made, for example, in the form of a SEDNET PCI card commercially distributed by the company SEDERTA under the reference SD-PCI-200 and can be used for the connection thereto of any existing data-processing apparatus designed to operate in conformity with the 1394 standard.

It is clearly possible to use an adapter specific to the data-processing apparatus which has to be connected thereto. The adapter 102 essentially comprises an interface component similar to the bus-interface component 101.

Depending on the type of data-processing apparatus, the principal bus 100, as well as the bus-interface component 101 and bus-controller component 99, may be adapted to the architecture of the type of apparatus. The same goes for the set of elements, CPU 93, RAM 95 and ROM 94.

As shown in FIG. 1, the node according to the invention also includes two interfacing means 103 and 104.

The means 103 is intended to provide the interface between the node 90 and the serial communications bus designed to operate according to the IEEE 1394 standard to which the said node is attached.

The interfacing means 103 consists of a set of 1394 PHY/LINK components comprising, for example, a TSB21LV03A PHY component and a TSB12LV01A LINK component which are commercially distributed by Texas Instruments (registered mark), and 1394 standard connectors, for example those marketed by the Company Molex (registered mark), for example under reference 53462.

The interfacing means 103 include at least one external port designed to be connected to a data-processing apparatus or peripheral that is attached to the 1394 serial communications bus.

The means 103 includes means for counting the number of pulses as a function of a clock signal generated by the control module 107 which will be defined later. This clock signal is synchronized with the "Cycle Master" of the serial communications bus with which it is related, by means of packets called cycle-start packets. The frequency of the clock signal generated by the control module 107 is equal to 24.576 MHz+/−100 ppm. This signal is represented as being one of the signals denoted ctrl3 in FIG. 1.

On each serial communications bus of the network, one of the nodes is called the "Cycle Master" and the "Cycle Master" node of the "root" bus is called the "Net Cycle Master".

Moreover, all the "Net Cycle Masters" exhibit a characteristic specific to them, since they depend on the frequency of the internal clock, on the basis of which the duration of one "reference period" or "cycle" is defined.

The duration of the cycle denoted T is equal to an integer number $n_{init}$ of clock pulses that is or is not common to all the buses and is multiplied by the inverse of the frequency of the internal clock specific to the "Cycle Master" node.

The duration of the cycle T is thus equal to 125 microseconds, for example.

When two serial communications buses are linked by a bridge, the "Cycle Master" of one of the buses has to synchronize its cycles with respect to the cycles generated by the "Cycle Master" of the adjacent bus.

Generally, the communications networks formed by serial communications buses allow packet transmission that is synchronized on the basis of the cycles of the buses in question. The buses are, for example, used to transmit audio/video type data packets in real time.

The counting means, such as those of the interfacing means 103 referred to here above, takes for example the form of a register.

The interfacing means 104 mentioned here above consists of an IEEE 1355 interface component with three ports. It has especially a component C113 (referenced 120 in FIG. 2) commercially distributed by the company 4LINKS as well as three interface components LUC1141MK commercially distributed by the company LUCENT (registered trademark). These components are themselves connected to IEEE 1355 connectors, for example commercially distributed by the firm HARTING (registered trademark). The component C113 is itself made out of an FPGA (field programmable gate array) type programmable component, namely a component such as the Spartan XCS30XL commercially distributed by the firm XILINX (registered trademark).

The three external ports of the interfacing means 104 are designed to be connected to ports of the same type on another switching node of the switched network, thus enabling the device 90 to communicate with another node of this network.

The device 90 also has a data flow control means 105 that is used to transfer data among the different interface components 101, 103 and 104. This means 105 is formed by programmable logic means executed by an FPGA type component, for example the component referenced VIRTEX, commercially distributed by the company XILINX.

This means 105 especially implements a dual port storage unit 106 used to store data addressed to or coming from the 1355 standard switched network.

The dual port storage unit has a storage capacity of less than 2 Mbits and is made for example in a form of a 32-bit access DPRAM type memory.

The initials DPRAM refer to "dual port random access memory".

The storage unit 106 has a plurality of memory zones managed as individual FIFO (first-in first-out) type memories.

A memory zone of this kind corresponds to a memory in which the data elements are read in the order in which they are written beforehand.

These memory zones each comprise a read pointer and a write pointer that are associated with each other.

Since each memory zone is managed as a FIFO type memory, its filling and emptying can be done at the same time and independently. This desynchronizes the data read and write operations, performed by a switching unit 108 that will be defined here below, from the data read and write operations performed by the control module 107.

Indeed, the occupancy rate of the memory zone considered is managed circularly and it is known, at all times, whether the data contained in a memory zone have been read or not. When these data have been read, then new data can be written in their place.

The dual port memory unit is, so to speak, a queue for the packets and the storage function is carried out independently, depending on the port by which the packets reach the memory unit.

In general, all the isochronous or asynchronous data coming from the switched network is stored in the storage unit 106.

This storage is temporary for the asynchronous data packets (namely packets constituting a message transmitted in non-connected mode) and for the control packets which are then transferred into the RAM storage means 95 for storage for a longer duration.

However, the isochronous data packets (stream type packets, namely packets transmitted in connected mode) are stored only in this storage unit 106 before being transmitted on the communications bus to which the switching node 90 is connected or on the switched network.

This can be explained by the fact that this type of data must be transferred as speedily as possible from the switched network to the bus and must therefore be stored in a storage means that is easily and swiftly accessible.

Similarly, the isochronous data packets that come from the communications bus to which the switching node 90 is connected and that are designed for the switched network, are stored only in the storage unit 106 and not in the storage means 95 for the same reasons as those referred to here above.

Thus, as shown in FIG. 1, the data flow control means 105 comprises several other elements, including a control module 107 (already mentioned here above) that carries out a function of checking the storage unit 106, a switching unit 108 (already mentioned further above) in communication with the interfacing means 104, with the storage unit 106 and the control module 107 as well as a unit for arranging the data packets 109 that is linked to the control module 107.

It will also be noted that the control module 107 communicates with the interfacing means 103 and 104 as well as with the bus interface component referenced 101.

The control module 107 has the function of multiplexing the read or write accesses to registers of other modules from the main bus referenced 100.

The module 107 also controls the bus interface component 101 for the read and write operations on the main bus 100, including especially the burst mode.

The control module 107 is also responsible for activating interruptions on the main bus 100 as a function of particular communications events.

This module exchanges data elements with the component 101 on an additional bus 110 (known as an add-on bus) following the control signals referenced ctrl1.

As indicated here above, the module 107 is responsible for controlling the storage unit 106 with respect to the read and write operations in FIFO mode, in the special case where the bus interface component 101 is an AMCC, by means of a data bus 111 and control signals ctrl2.

The interfacing means 103 contain FIFO type memories used during the transfer of data packets of the type conforming to the IEEE 1394 standard. It has two transmission FIFO memories known as an ATF (asynchronous transfer FIFO) and an ITF (isochronous transfer FIFO) and one reception FIFO memory known as a GRF (general receive FIFO). These FIFO memories are extensively described in the literature associated with the component LINK TSB12LVO1A.

The control module 107 and the interfacing means 103 manage the data transfer on a bus 112 according to the control signals ctrl3.

Furthermore, the control module 107 controls the switching unit 108 by means of control signals ctrl4 in order to transfer data from the switching unit to the storage unit 106 by means of a data bus 113 and vice versa.

The switching unit 108 is connected to the interfacing unit 104 by means of a data bus 114 and control signals ctrl5.

The data packet arranging unit 109, also known as a SAR (segmentation and reassembling) unit, informs the control module 107 of the next data packet or packets to be transmitted, by means of control signals ctrl6.

Furthermore, the SAR unit 109 verifies the reception of the data packets and manages the allocation and the releasing of memory zones (known as buffers) of the storage unit 106.

The control signals ctrl7 exchanged between the interfacing means 104 and the control module 107 comprise especially the clock signals regenerated from the reception of the packets 1355 on each of the three ports of the interfacing means 104.

A quartz crystal at 49.152 MHz (not shown) is connected both to the means 104 for the sending of the 1355 standard packets and to the control module 107 which generates a clock signal at 24.576 MHz±100 ppm, firstly for the segmentation and reassembling unit 109 in order to set the rate of the 1355 standard packet transmission and secondly for the interfacing means 103 to set the rate of the 1394 standard packet transmission.

Figure 2:
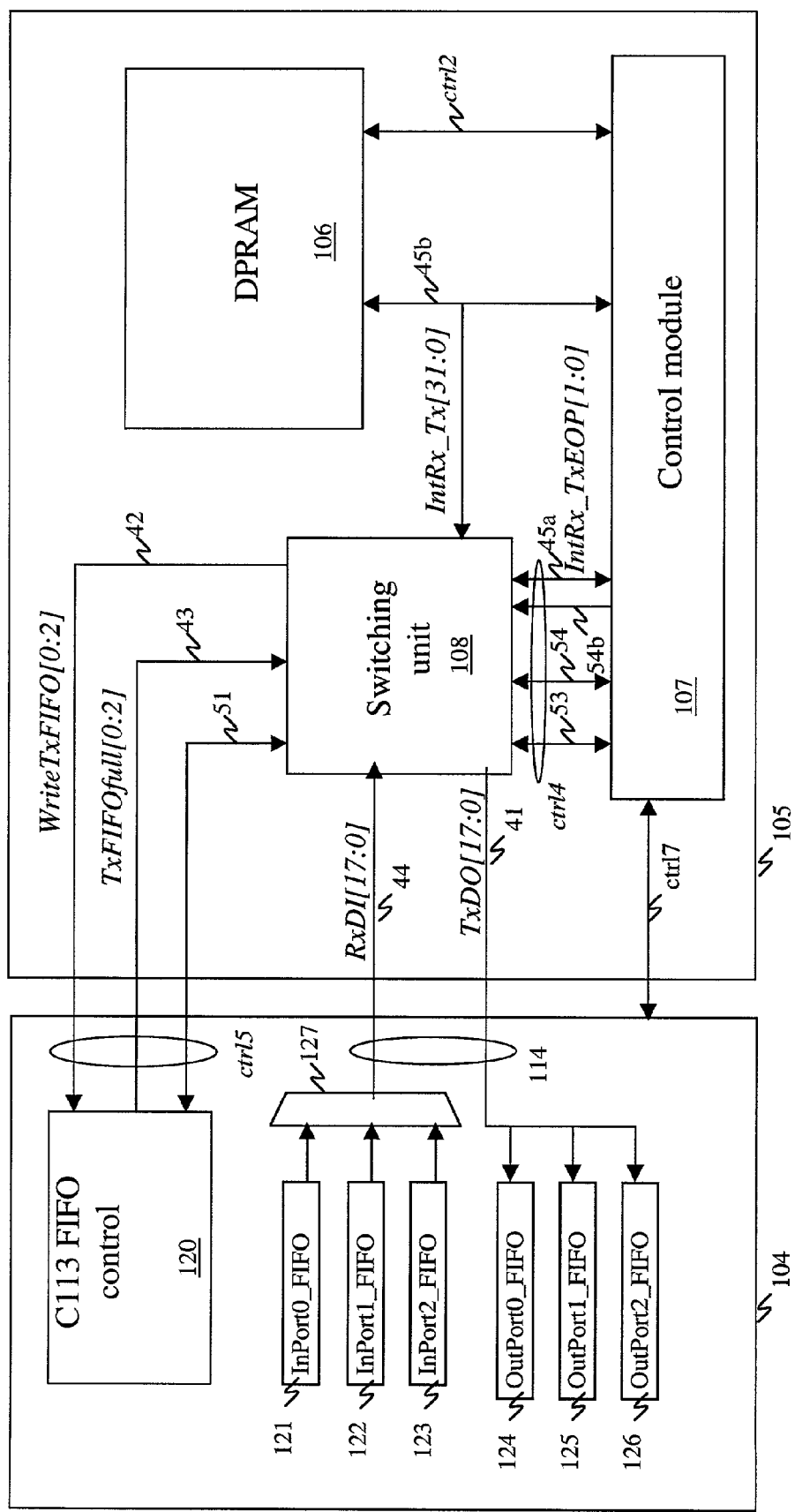
FIG. 2 is a detailed block diagram of a data flow control means and of an interface with a serial link, both belonging to the switch shown in FIG. 1, as well as their interconnections.

FIG. 2 shows a detailed diagrammatic view of the data flux control means 105 and the interface 104 illustrated with reference to FIG. 1 as well as their interconnections.

Some details on the serial interface 104 will provide for an understanding of how the packets are multiplexed on the data bus 114.

The serial interface 104 comprises especially:
a FIFO control means 120 described here above with reference to FIG. 1;
three input FIFOs 121 (InPort0_FIFO), 122 (InPort1_FIFO) and 123 (InPort2_FIFO);
a multiplexer 127; and
output FIFOs 124 (OutPort0_FIFO), 125 (OutPort1_FIFO) and 126 (OutPort2_FIFO).

The FIFOs 121, 122 and 123 are used to store incoming packets while the FIFOs 124 to 126 are used to store outgoing packets.

A pair of FIFOs is connected to each port of the IEEE 1355 interface 104. Thus, for example:
the FIFOs 121 and 124 are used for the port 0;
the FIFOs 122 and 125 for the port 1; and
the FIFOs 123 and 126 for the port 2.

The data bus 114 illustrated with reference to FIG. 1 can be subdivided into two buses in FIG. 2:
a bus RxDI[17 :0] 44 for the reception of data sent to the switching unit 108 and transmitted by the interface 104; and
a bus TxDI[17 :0] 41 for the transmission of data from the switching unit 108 to the interface 104.

After they have been written in one of the input FIFOs 121, 122 and 123, the incoming packets are multiplexed through the multiplexer 127 before they are sent to the switching unit 108 through the bus 44.

The outgoing data from the switching unit 108 are sent through the data bus 41 to be stored in one of the output FIFOs 124, 125 or 126.

It may be recalled that the data flux control means 105 comprises especially:
the control module 107;
the switching unit 108; and
the dual port memory unit or DPRAM 106.

The control signal Ctrl5 illustrated with reference to FIG. 1 can be broken down into three signals in FIG. 2:

a control signal 51;
a control signal TxFIFOfull[0 :2 43; and
a control signal WriteTxFIFO[0 :2] 42.

The control signals TxFIFOfull[0 :2] 42 and WriteTxFIFO[0 :2] 43 are used by the control means 120 of the FIFO to manage the transfer of the data packets between the switching unit 108 and a serial link interface 104 through the data buses 44 and 41.

The processing of the control signals in the switching unit 108 shall be described further below with reference to FIG. 3.

The signal Ctrl4 illustrated with reference to FIG. 1 between the switching unit 108 and the control module 107 can be subdivided into at least four signals in FIG. 2:
two control signals 53 and 54;
a control signal IntRxTxEOP[1: 0] 45*a*;
a data signal IntRx_TX[31: 0] 45*b*.

The signal 45*b* is a data bus connecting the elements 106, 107 and 108. The control module reads the packet headers from this bus 45*b*.

The control signals 53, 54 and 45*a* are used for the management of data transfer IntRx_TX[31: 0] 45*b* between the dual port memory 106 and the switching unit 108.

In certain cases, especially during the packet header processing, the data of the packets are sent to the control module 107 rather than to the storage unit 106 for subsequent analysis.

The data bus 45*b* is shown in FIG. 1 by the data bus 113.

Figure 3:
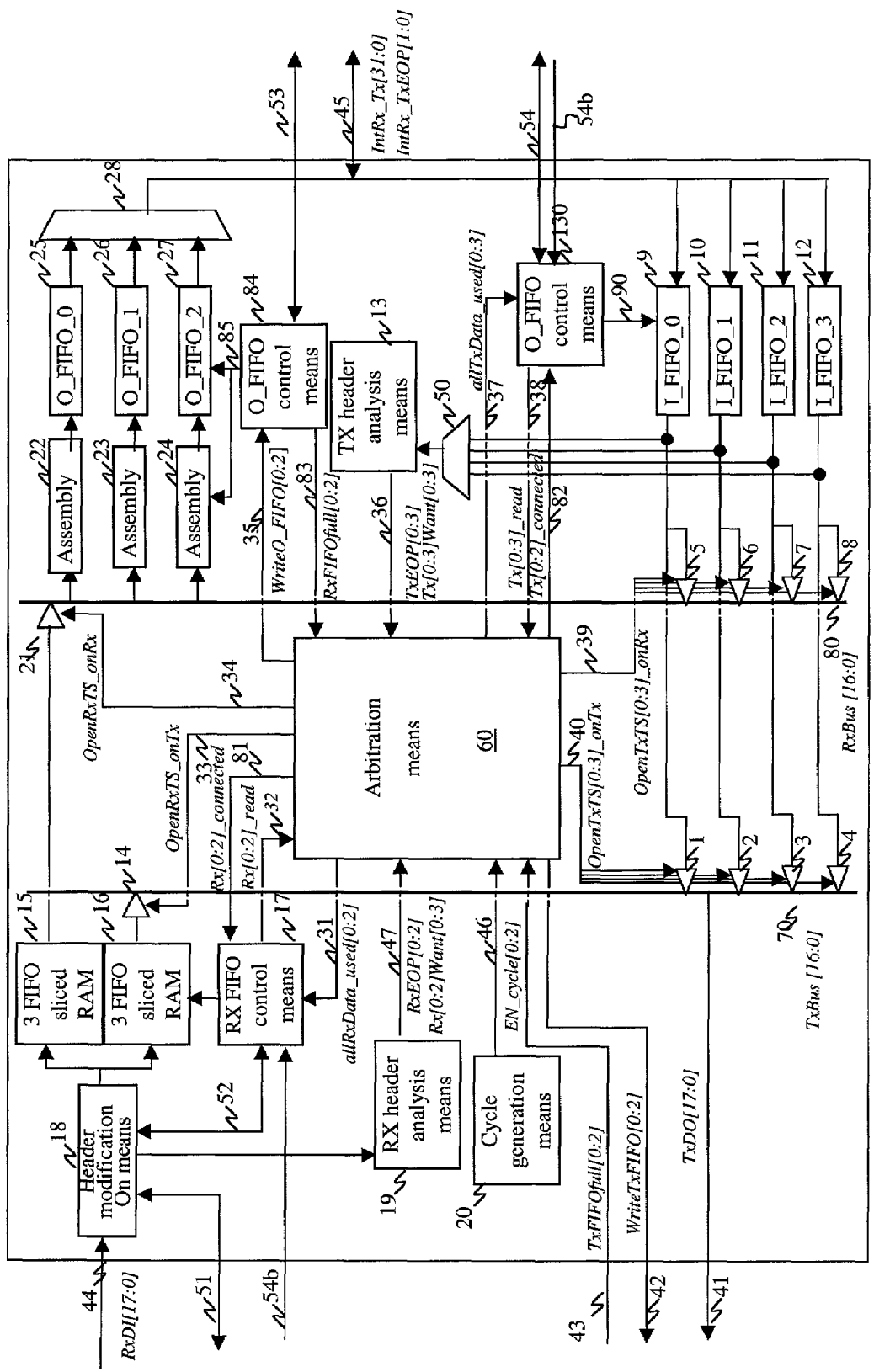
FIG. 3 is an electronic diagram of the switching module included in the data flow control means of FIG. 2.

FIG. 3 shows an electronic diagram of the switch module 108 of FIG. 1.

The switch module 108 comprises especially:
an arbitration means 60;
a cycle generation means 20;
means responsible for the reception and transmission of data from or to the interface 104 (namely data coming from or addressed to an IEEE 1355 switched network);
means responsible for the reception of data coming from the DPRAM memory 106 (namely data coming from an IEEE 1394 bus); and
means responsible for sending data to the DPRAM memory 106 (namely data sent to an IEEE 1394 bus).

The means responsible for the reception and sending of data from or to the interface 104 comprise especially:
a header modification means 18;
a means 19 for the analysis of headers at reception;
two reception RAMs 15 and 16 arranged as FIFOs; and
a means 17 for controlling the reception FIFOs 15 and 16.

The means responsible for data reception from the memory DPRAM 106 comprise especially:
four input FIFOs 9, 10, 11 and 12;
one means 130 for the control of the input FIFOs;
one multiplexer 50; and
one transmission header analysis means 13.

The means responsible for the transmission of data to the DPRAM memory 106 comprise especially:
three assembling memories 22, 23 or 24;
three output FIFOs 25, 26 and 27;
a means of control 84 of the output FIFOs; and
a multiplexer 28.

These elements, which form part of the switch module 108, are connected by linking elements described here below. It can be seen nevertheless that most of the exchanges are made around the arbitration means 60 with the use of two main data buses TxBus 70 and RxBus 80 whose accesses are managed by the arbitration means 60.

The use of the two internal buses, the transmission bus TxBus 70 and the reception bus RxBus 80 which process the data transfers between the ports shall now be described in detail.

The outgoing packets towards the bus 41 are sent through the transmission bus TxBus 70.

The outgoing packets towards the bus 45 are sent through the internal reception bus RxBus 80.

The arbitration means 60 is responsible for managing write accesses on the bus TxBus 70 controlling the opening of:

three-state registers 1, 2, 3 and 4 by means of signals Open TxTS[0 :3] on Rx 40 for the data coming from the input FIFOs 9, 10, 11 and 12; and three-state registers 14 by means of control signals Open-RxTS_on Rx 33 for the data coming from the memory 16.

The operations of reading the bus TxBus 70 for writing to an output port of the interface 104 are managed by the arbitration means 60 as a function of the control signal to the FIFOs associated with each port, namely the signal TxFIFOfull[0 :2] 43 and the signal WriteTxFIFO[0 :2] 42.

The arbitration means 60 also manages the write access towards the bus RxBus 80 in controlling the opening of:

three-state registers 5, 6, 7 and 8 through the signals OpenTxTs[0 :3]_on Rx 39 for data coming from the input FIFOs 9, 10, 11 and 12; and a three-state register 21 through the control signals Open-RxTs_on Rx 34 for the data coming from the memory 15.

The arbitration means 60 also performs the operations of data reading on the bus RxBus 80 for writing towards one of the assembly buffers 22, 23 or 24. The assembly buffer is a buffer for the conversion of data between the bus 80, on which the data are expressed on 18 bits (16 data bits and 2 check bits) and the 0_FIFOs 25, 26 and 27 in which the data is expressed on 34 bits) (32 data bits and 2 check bits).

These bus sizes are related to physical constraints. The module 84 sends the arbitration means 60 a control signal Rx FIFOfull[0 :2] 83, indicating the degree of filling of the FIFOs 25, 26 and 27. The arbitration means 60 generates a control signal WriteO_FIFO[2 :0] 35 sent to a control module 84 of the output FIFOs as a function of the degree of filling of the FIFOs 25, 26 and 27.

The arbitration means 60 for data multiplexing on the transmission bus TxBus 70 and the reception bus RxBus 80 uses signals 46 with a cycle EN_cycle[0:2]. It is the cycle generation means 20, for example a Johnson counter, that generates these signals 46.

The processing of incoming data shall now be described in detail according to the origin of these data, namely:

the bus 44;

the bus 45.

The incoming data coming from the bus RxDI[17 :0] 44 or the bus 45 will be routed towards the selection switch to go:

towards the bus TxD0[17 :0] 41 or towards the bus 44, namely in the direction of the interface 104; or towards the bus 45, namely in the direction of the DPRAM 106.

The processing of the incoming data from the bus 44 shall now be described.

The data exchanges on the bus 44 are managed through the header modification means 18 and the FIFO control means 120 of the serial interface, by means of the control signals 51. The control signals 51 include a write signal sent towards the header modification means 18 and signals to control the flux of the means 18, each corresponding to input ports of the interfacing means 104.

The pieces of packets incoming from the bus 44 first of all reach a header modification means 18 for a processing of packet headers.

The pieces of packets are then stored:

in the memory 15 when they are addressed to the reception bus RxBus 80; and in the memory 16 when they are addressed to the transmission bus TxBus 70.

When they are sent to the two buses, the pieces of packets are sent to the two buses simultaneously to be stored in two storage means simultaneously.

Similarly, the reception FIFO control means 17 control the storage operations in two memories 15 and 16.

The memories 15 and 16 are dual port memories subdivided into three independent zones, each managed as a FIFO.

The synchronous signals are managed at a certain rate corresponding to a succession of phases constituted by four clock cycles.

In a four-cycle phase, during each of the first three clock cycles of the phase, both a write operation and a read operation are performed towards two addresses of each of the RAMs (volatile memories) 15 or 16. These addresses respectively point towards:

the last element (tail) of one of the FIFOs in each of the RAMs 15 and 16; and the first element (head) of one of the FIFOs in each of the RAMs 15 and 16.

No read or write operation towards the RAM 15 and 16 is performed during the fourth clock cycle in a four-cycle phase.

Each effective FIFO read operation (defined when the output signal Rx[i]_read 32 is activated during a cycle and followed by an input signal AllData used[i] activated during a cycle, i corresponding to a number of the input FIFO) modifies the address pointing to the FIFO header.

Effective FIFO write operations (based on the same mechanism as the read operations herein using the signal 52 illustrated with respect to FIG. 3) modify the address pointing to the tail of the FIFO.

Thus, during three cycles, each FIFO part corresponding to each of the input ports is processed: the data writing operations performed by the header modification means 18 are sequentially addressed towards the corresponding parts 15 and 16, each of the pieces of packets entering each of the input ports 121, 122 and 123 of the interface 104.

Similarly, the data elements read from the memories 15 and 16 are processed respectively by the buses RxBus 80 and TxBus 70.

The reception FIFO control means 17 is responsible for the reading and effective writing of the FIFOs contained in the memories 15 and 16.

The control signal 52 informs the header modification means 18 that a FIFO is full in one of the memories 15 or 16 and that there is also a write request for a FIFO in one of the memories 15 or 16.

The reception FIFO control means informs the arbitration module 60 that a new data element has been read from one of the memories 15 or 16 through the signal Rx[0 :2] read 32.

The same data elements are read at each four-cycle phase when they are not read effectively by placing them simply, either on the bus RxBus or on the bus TxBus or on both of the buses as a function of the routing of the packet.

Thus, the same data elements are presented every four cycles until they have been really read by the destination or destinations.

The arbitration means 60 manages the opening of the three-state register 14 through the control signals OpenRxTs_onTx 33 to place the pieces of reading data of the memory 16 on the transmission bus TxBus 70.

The means 60 also manages the opening of the three-state register 21 through the control signals OpenTxTs_onRx 34 to place the pieces of data, that have been read, of the memory 15 on the reception bus RxBus 80.

The arbitration means 60 also manage the control of the signals allRxData_used[0:2] to inform the control means 17 of the reception FIFOs that the next data element will be read on a corresponding part in one of the memories 15 or 16.

The received packet header analysis means 19 controls the shape of the signal 47 sent to the arbitration means 60.

When a new packet coming from one of the input ports 121, 122 or 123 is processed by the header modification means 18, the signal Rx[0:2]Want[0:3] 47 enables the request of a connection:
to one of the output ports of the interface 104 through the multiplexed bus 41; or
to one of the internal FIFOs 25, 26 or 27 through the multiplexed bus 45.

When the end of the packet is processed by the header modification means 18, the signal RxEOP[0:2] 47 informs the arbitration means 60 of the end of a connection.

It will be noted that the header modification means 18 sends a signal representing a piece of routing information to the reception header analysis means 19.

With respect to connection and disconnection to and from the IEEE 1355 serial interface, the arbitration means 60 manages the signals Rx[0:2]_connected 81 sent to the reception FIFO control means 17 to indicate the status of the connection associated with each port.

Similarly, the arbitration means 60 manages the signals Tx[0:2]_connected 82 sent to the control means 130 of the input FIFOs 9, 10, 11 and 12 for the data coming from the DPRAM 106.

The data exchanged on the bus 45 are managed:
by the means 84 for the control of the output FIFOs 0_FIFO and the control module 107 by means of the signal 53; and
by the means 13 for the control of the input FIFOs I-FIFO and the control module 107 by means of the signal 54.

The multiplexer 28 authorizes the selection of an output FIFO 0_FIFO among the three FIFOs 25, 26 or 27 for operations of reading FIFOs containing data intended for the dual port storage memory 106. This selection operation is managed by the output FIFO 0_FIFO control means 84 through a signal 85.

Furthermore, the input FIFO I_FIFO control means 130 control write operations of the storage memory 106 at one of the four input FIFOs I_FIFO referenced 9, 10, 11 or 12 through the signals 90.

This is only the case for the bus 42 where the control signals 43 and 42 attached to the storage means of the output ports are directly connected to the arbitration means 60.

In other words, the bus 41 is the only bus whose control signals (42 and 43) are directly connected to the arbitrator 60.

The processing of incoming data from the bus 45 shall now be described in detail.

The packet pieces coming from the bus 45 are demultiplexed towards each input FIFO 9, 10, 11 and 12. Thus, four packets (one per input FIFO) can be processed simultaneously.

Each input FIFO is connected to two internal buses 70 and 80 through the three-state registers 1 to 8.

The arbitration means 60 is responsible for managing:
the write access on the bus TxBus 70 alternately controlling the opening of the three-state registers 1 to 4 through the signals OpenTxTs[0:3]_on Tx referenced 40, each of the registers 1 to 4 being assigned to an input FIFO 9 to 12; and
the write access on the bus RxBus referenced 80 alternately controlling the opening of the three-state registers 5 to 8 though the signals OpenTxTs[0:3]_onRx 39, each of the registers 5 to 8 being assigned to an input FIFO 9 to 12.

The write operations on the bus RxBus 70 are independent of the write operations on the bus TxBus 80.

The arbitration means 60 also generate control signals allTxData used[0:3] 37 that permit the reading on one of the input FIFOs 9 to 12 through the control means of the input FIFO 130.

The control means 130 of the input FIFOs informs the arbitration means 60 of the success of a read operation performed by one of the input FIFOs through the control signal Tx[0:3]_Read referenced 38

The packet header data elements are multiplexed by a multiplexer 50 of one of the output FIFOs 9 to 12 to be sent to the header analysis means 13.

The transmitted packet header analysis means 13 analyzes the data coming from the input FIFOs 9, 10, 11 and 12 to generate the signal Tx[0:3] Want[0:3] 36 sent to the arbitration means 60.

When a new packet is processed in one of the input FIFOs 9 to 12, the signal Tx[0:3] Want[0:3] 36 enables the request of a connection:
to one of the output ports of the interfacing means 104 through a multiplexed bus 41; and
to one of the output FIFOs 25, 26 or 27 through a multiplexed bus 45.

When the end of the packet is processed in one of the input FIFOs 9 to 12, the signal TxEOP[0:3] 36 is used to inform the arbitration means 60 of an end of connection.

Figure 4:
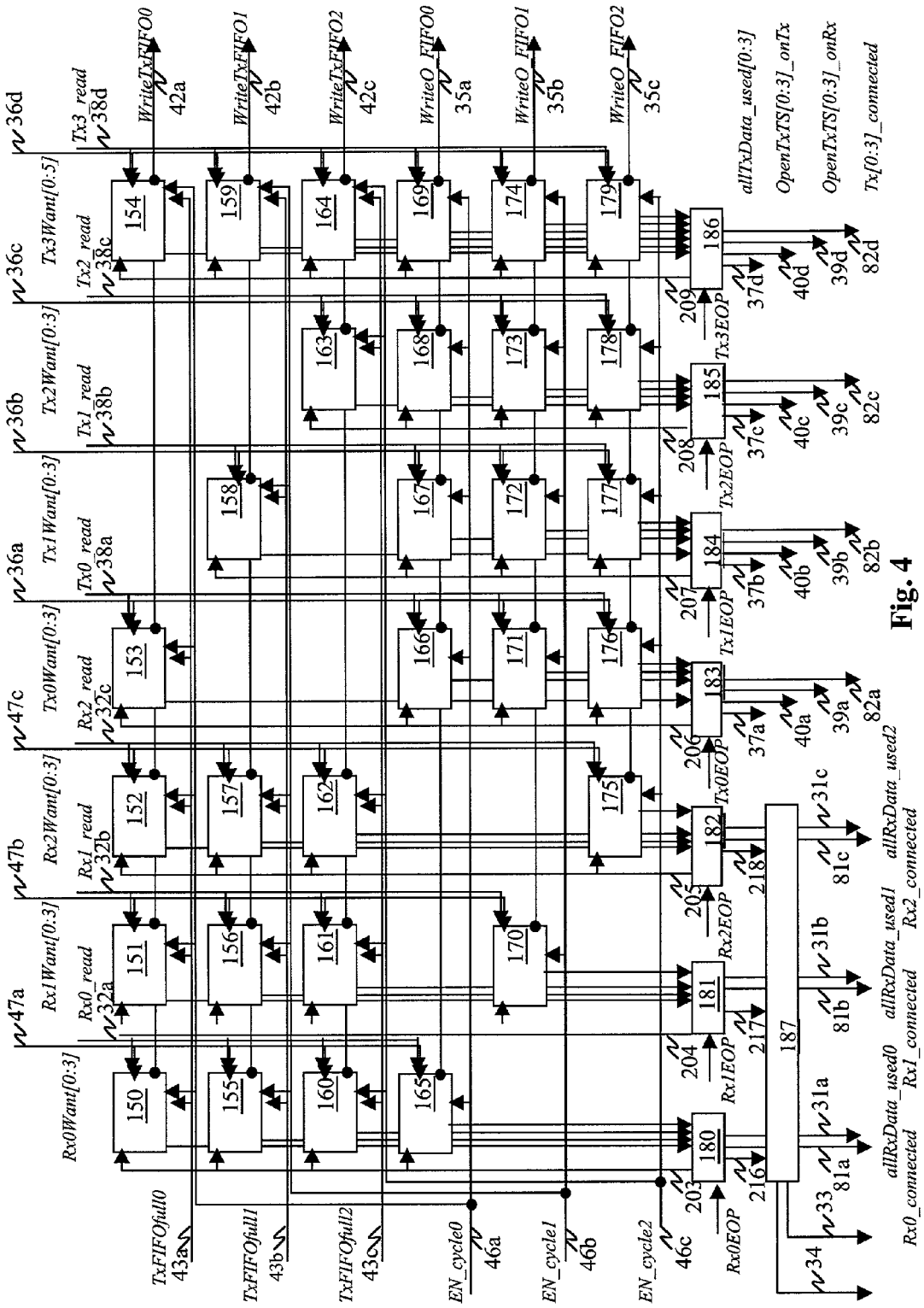
FIG. 4 is an electronic diagram of the arbitration means (or switching matrix) included in the switching module of FIG. 3.

FIG. 4 illustrates a detailed implementation of the arbitration means 60. The arbitration means is in charge of the generation of the time division multiplexing in combination with the management of the connections. Here, a connection refers to a slot allocated to a packet to achieve a routing from an incoming port to an outgoing port.

A connection cycle is associated with each outgoing port. The establishment of a connection associates an incoming port with at least one connection cycle and validates the mechanism of writing protocol data units at the outgoing port associated with the connection cycle or cycles considered.

The key element of the arbitration means 60 is an elementary crosspoint.

In the preferred embodiment, the arbitration means 60 especially comprises:
30 elementary crosspoints referenced 150 to 179; and
seven central crosspoint processing means 180 to 186 performing OR type operations on elementary signals; and
one processing means 187 performing OR type operations on elementary signals.

The thirty elementary crosspoints 30 are organized in rows and columns. The columns process signals attached to incoming ports while the rows process signals attached to the outgoing ports.

A column is allocated to each input FIFO or in an equivalent way to each incoming packet.

Thus, the first, second and third columns correspond to three FIFOs made out of dual port memories 15 and 16 as shown with reference to FIG. 3), respectively attached to the FIFOs InPort0_FIFO 121, InPort1_FIFO 122 and InPort2_FIFO 123 of the serial interface 104.

Similarly, the 4th, 5th, 7th and 8th columns are respectively attached to the input FIFOs I_FIFO_0 9, I_FIFO_1 10, I_FIFO_2 11 and I_FIFO_3 12.

A row is allocated to each output FIFO or in an equivalent way attached to each outgoing packet:

Thus, the first, second and third rows correspond to three output FIFOs OutPort0 FIFO 24, OutPort1 FIFO 125 and OutPort2 FIFO 126 with the serial interface and attached to the time slots of the bus TxBus 70.

Similarly, the 4th, 5th, 6th rows correspond to the internal output FIFOs of the switch, respectively the FIFOs O_FIFO_0 25, O_FIFO_1 26 and O_FIFO_2 27 attached to the time slots of the bus RxBus 80.

The slots available for the connection pertain to rows (hence to output ports), which means that it is possible to process six connections simultaneously. So long as a crosspoint has been selected with a row, the corresponding time slot or the corresponding output FIFO are allocated to an incoming packet. Thus, no other packet can be transmitted during this time slot while the existing connection remains active, until the end of the transfer of the current packet.

To obtain such behavior, the elementary crosspoints on a row are daisy-chained so as to provide for only one connection at a time. For example, the elementary crosspoints 150 to 154 are daisy-chained to enable the transfer of only one incoming packet during the slot 0 of the bus TxBus 70. Similarly, the elementary crosspoints 165 to 169 are daisy-chained to enable the transfer of only one incoming packet during the slot 0 of the bus RxBus 80.

According to the preferred embodiment, an incoming packet may be transferred simultaneously on four slots when the arbitration matrix comprises four elementary crosspoints per column distinct from the last column.

The last column transfers packets to all the slots simultaneously and the arbitration matrix includes six elementary crosspoints associated with this last column. This last column corresponds to the special implementation of the broadcasting FIFO I_FIFO_3 12.

According to one particular embodiment of the switch, a simplified arbitration matrix eliminates pairs of elementary crosspoints and, for example, when the bus 45 is attached to an internal point, the crosspoints 166 to 169, 171 to 174 and 176 to 179 are no longer useful because they will be used only for the traffic generated by the internal point for itself.

According to the preferred embodiment, for each column signalling, the input signals 471*a* to 471*c* and 47*a* to 47*c* (Rx[0:2]EOP and Rx[0:2]Want[0:3]) and 361*a* to 361*d* and 36*a* to 36*d* (Tx[0:2]EOP and Tx[0:2]Want[0:3]) inform each elementary crosspoint of the same column respectively of the end of the transfer of a packet (release of the connection) or of a new packet to be transferred (connection request).

It can be noted that the input signals 361*a* to 361*d* and 36*a* to 36*d* (as illustrated with reference to FIG. 3 under reference 36) are generated by the transmission header analysis means 13.

The input signals 32*a* to 32*c* (Rx[0:2]_read) and 82*a* to 82*d* (Tx[0:2]_read) inform each elementary crosspoint of the same column of the availability of a new protocol data unit to be processed during the connection cycle determined beforehand when this connection is being set up.

The signals 471*a* to 471*c* and 47*a* to 47*c* are generated by the reception header analysis means 19 as illustrated with reference to FIG. 3 under the reference 47.

The signals 32*a* to 32*c* and 38*a* to 38*d* are generated respectively by the reception FIFO control means 17 and the input FIFO control means 130 as illustrated with reference to FIG. 3 under the respective references 32 and 38.

Each column is associated with one of the central crosspoints 180 to 186. Thus, for example, the column comprising the elementary crosspoints 150, 155, 160 and 165 is associated with the central crosspoint 180.

Each of the processing means 180 to 186 performs an OR type operation on the control signal generated for each slot corresponding to the column that is associated with it and for each bus (respectively on the buses TxBus 70 and RxBus 80) corresponding to each connection cycle.

An output signal 203 to 209 coming from each central crosspoint respectively 180 to 186 is connected with each crosspoint of the column corresponding to the crosspoint considered and enables the validation of the effective writing of the protocol unit on to the outgoing port associated with the connection cycle considered.

The output signals 203 to 209 respectively represent the signals:

OpenRxTs0_onTx[0:2] and Rx0_EOP_sent (203);
OpenRxTs1_onTx[0:2] and Rx1_EOP_sent (204);
OpenRxTs2_onTx[0:2] and Rx2_EOP_sent (205);
OpenTxTs0_onTx[0:2] and Tx0_EOP_sent (206);
OpenTxTs1_onTx[0:2] and Tx1_EOP_sent (207);
OpenTxTs2_onTx[0:2] and Tx2_EOP_sent (208); and
OpenTxTs3_onTx[0:2] and Tx3_EOP_sent (209);

The means 187 perform an OR type operation (represented by the sign) on the output signals 216 to 218 (in complying with the specific implementation of the FIFOs present in the dual port memories 15 and 16) of the central crosspoints 180 to 182 that correspond to the first three columns of the arbitration matrix.

Thus, for example, a protocol unit present in one of the FIFOs of the RAM 15 is presented on the bus RxBus 80 when one of the signals OpenRxTs0_onRx[0:2] activates the opening of the three-state register 21 associated with the FIFO of the memory 15. Since all three FIFOs of the memory 15 associated with the FIFO InPort0_FIFO 121, InPort1_FIFO 122 and InPort2_FIFO 123 are done from the dual port memory 15 associated with the bus RxBus 80, a single three-state register 21 is needed between respectively the memory 15 and the bus RxBus 80. It is therefore enough for one of the signals OpenRxTS[0:2]_onRx[0:2] to be valid to turn the three-state register 21 on. The register 21 is therefore controlled by the signal OpenRxTS_onRx 34 generated by the means 187 according to the following relationship:

OpenRxTS_onRx=OpenRxTS0_onRx[0:2]
OpenRxTS1_onRx[0:2] OpenRxTS2_onRx[0:2]

Similarly, a single three-state register 14 between the memory 16 and the bus TxBus 70 is controlled by the signal OpenRxTS_onTx 33 generated by the means 187 according to the following relationship:

OpenRxTS_onTx=OpenRxTS0_onTx[0:2]
OpenRxTS1_onTx[0:2] OpenRxTS2_onTx[0:2]

The means 187 also generates output signals 31*a*, 31*b*, 31*c*, 81*a*, 81*b* and 81*c* and is connected to the reception control means 17 RxFIFO.

The output signals 37*a* to 37*d* and 82*a* to 82*b* respectively corresponding to the 4th, 5th, 6th and 7th columns are connected to the input FIFO control means 130. The output signals 40*a*, 40*d* respectively control the three-state registers 1 to 4 and the output signals 39*a* and 39*d* respectively control the three-state registers 5 to 8 illustrated with reference to FIG. 3.

For the signaling by row, input signals chiefly include cycles enabling time slots 46*a*, 46*b* and 46*c* that validate the connection cycles:

for any writing on the output FIFOs respectively 124, 125 or 126 through the bus TxBus 70; or for the writing on the internal FIFOs 25, 26 and 27 through the bus RxBus 80.

It will be noted that, during one and the same time slot, a write operation can take place simultaneously on an output FIFO and on an internal FIFO.

An internal FIFO must be constantly available for writing in order to comply with a high speed of the bus 45 while the output FIFO may sometimes cope with congestion on the network. This is why each of the 1st, 2nd and 3rd rows also include a complete FIFO signalling 43*a*, 43*b* or 43*c* of the output FIFOs respectively 124, 125 and 126. All the input signals connected to a row are connected to each elementary crosspoint with this row. The resulting output signals for each row 42*a* to 42*c* and 35*a* to 35*c* are generated by a simple elementary crosspoint with their corresponding row, this row having previously gained a connection with the row.

As described here above, the header modification means 18 is responsible for processing the received packet. This includes:

the analysis of the header of the packet (the retrieval of the routing information to generate the signals 52 used to carry out the routing);

the transfer of the data contained in the packet: the write operations sequentially address the corresponding zones in the memories 15 and 16 for each packet part coming from each input port;

the end-of-packet detection (giving information about the end of connection through the signals 52).

A detailed presentation shall now be given of the implementation of a preferred embodiment of the method according to the invention, by the switch (or switch device) 90 described here above (with reference to FIGS. 1 to 4).

We shall now give a detailed view of the implementation of a preferred embodiment of the method according to the present invention by the switch (or switch apparatus) 90 described here above with reference to FIGS. 1 to 4).

The ROM 94 (see FIG. 1) stores a software program implementing an algorithm for the calculation of the spanning tree of the network for the broadcasting of the broadcast packet. This algorithm, which is specific to the present invention, is described in detail here below with reference to FIG. 7.

The central processing unit CPU 93 (see FIG. 1) of the switch 90 executes this algorithm in order to compute the spanning tree and therefore find out, for each switch of the network and especially for the switch 90, the output ports (each connected to a link) concerned by the broadcast.

According to one variant of the invention, the calculation algorithm of the broadcast spanning tree is executed in a centralized way (and not by each of the nodes) and the result is communicated to each of the nodes.

The result for the switch 90 is a signal comprising a plurality of broadcasting bits, each of these broadcasting bits indicating whether one of the output ports of the switch 90 is concerned or not by the packet broadcasting. This result signal (broadcasting bits) is conveyed from the central processing unit CPU 93 to the control module 107 through the bus controller 99, the main bus 100 and the bus interface 101 (see FIG. 1).

Between the control module 107 and the switch unit 108, the above-mentioned result signal (broadcasting bits) is transmitted as an additional component 54*b* of the signal Ctrl4 (see FIG. 1). It is recalled that the other four components of the signal Ctrl4 are (see FIG. 2): two control signals 53 and 54, one control signal IntRxTxEOP[1 :0] 45*a* and one data control signal IntRx_TX[31 :0] 45*b*.

As shown in FIG. 3, within the switch unit 108, the above-mentioned result signal (broadcasting bits) 54*b* is sent:

to the control means 17 of the reception FIFOs. This means 17 forms part of the means responsible for the reception and transmission of data coming from or to the interface 104. It is recalled that the interface 104 processes data coming from or sent to a switched network IEEE 1355;

the means 130 for controlling the input FIFOs. This means 130 is part of the means responsible for data reception coming from the DPRAM 106. It may be recalled that the DPRAM 106 processes data coming from and/or sent to an IEEE 1394 bus as well as data coming from and/or sent to the central processing CPU 93. It is precisely in this second type of data that the above-mentioned result signal enters (broadcasting bits) 54*b*.

Referring to FIG. 3, we shall now successively describe two modes of operation of the switch 90 depending on whether it acts as a generator node (source node) or the receiver node (intermediate or final node) of a broadcast packet to be broadcast in an IEEE 1355 switched network.

In the first embodiment (generator node), the broadcast packet to be sent is stored in one of the four input FIFOs 9, 10, 11 and 12. Once the data contained in the broadcast packet are sent on the transmission bus TxBus 70 and then on the bus TxDO[17 :0] 41 (data transmission bus from the switching unit 108 to the interface 104), the input FIFO control means 130 inform the arbitration means 60 of all the output ports concerned by the broadcast. Subsequently, the control signal WriteTXFIFO[0 :2] 42 indicates simultaneous read operations on the output FIFO or FIFOs concerned (namely on one or more of the three following FIFOs (see FIG. 2): OutPort0_FIFO 124, OutPort1_FIFO 125 and OutPort2_FIFO 126).

By way of a comparison, it will be noted that the data of a unicast packet sent by the switch 90 are always written on only one of these three FIFOs 124 to 126.

In the second mode of operation (receiver node) after reception of a broadcast packet, the data contained in this packet are given:

firstly to the volatile reception memory 15 laid out as a FIFO from where it then goes successively on the internal reception bus RxBus 80 and then on one of the three internal output FIFOs (O_FIFOs) 25, 26 and 27 and finally the internal bus 45. From this internal bus 45, the data contained in the broadcast packet received are then sent to the appropriate processing means included in the switch 90 (for example the central processor unit CPU 93);

secondly the reception volatile memory 16 laid out as a FIFO from where it goes to the transmission bus TxBus 70. Then, just as in the first mode of operation described here above, the data contained in the broadcast packet are sent on the bus TxDO[17 :0] 41. Furthermore, the means 130 for controlling the input FIFOs inform the arbitration means 60 of all the output ports concerned by the broadcast, except for the output FIFO corresponding to the input port on which the broadcast packet has been received. Finally, the control signal WriteTXFIFO[0 :2] 42 indicates simultaneous write operations on the output FIFO or FIFOs concerned except for one concerned by the above-mentioned exception is related (for this operation, the control signal 42 is masked).

By way of a comparison, it will be noted that the data elements of a unicast packet received by the switch 90 appear solely on the internal reception bus RxBus 80 and never on the transmission bus TxBus 70.

Figure 5:
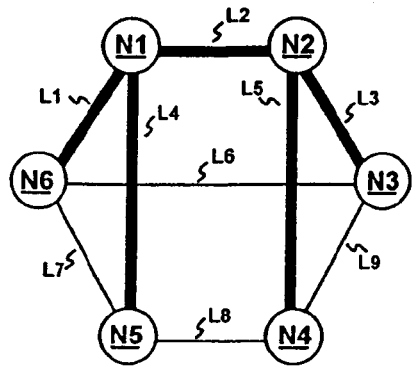
FIGS. 5 and 6 each present an exemplary spanning tree of one and the same network, computed respectively with the prior art technique and the technique of the invention.
Figure 6:
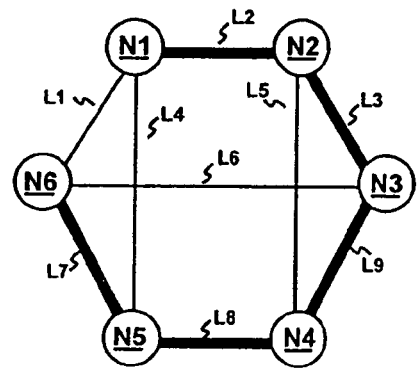

By way of an illustration, for one and the same example of a network, two spanning trees are now presented:

one (see FIG. 5) computed according to the prior art and hereinafter called a "prior art tree";

the other (see FIG. 6) according to the technique of the invention hereinafter called the "tree of the invention".

The small network has six nodes N1 to N6 and nine links L1 to L9. The links shown in bold are those belonging to the spanning tree for the broadcasting.

The prior art tree (see FIG. 5) takes account of a "cost" per link such as, for example, the occupancy rate pertaining to a unicast traffic. It is assumed that the occupancy rates of the links are those indicated in the following table:

| Link | L1 | L2 | L3 | L4 | L5 | L6 | L7 | L8 | L9 |
|---|---|---|---|---|---|---|---|---|---|
| Occupancy rate in % | 15 | 10 | 12 | 20 | 21 | 40 | 25 | 24 | 22 |

It may be recalled that the prior art technique seeks to choose the spanning tree that minimizes the total "cost" of the links forming the spanning tree.

However, the prior art tree is not optimal according to another criterion. Indeed, nodes N1 to N2 each have three ports forming part of the spanning tree. In other words, each of the nodes N1 and N2 is connected to three links of the spanning tree.

This means that, if the node N1 is the source node and seeks to broadcast a packet, it must wait for the simultaneous availability of the links L1, L4 and L2. If we assume that the links are free with a probability of 85%, 80% and 90% respectively and that the link traffic is independent, it means that the probability of a simultaneous availability of the links L1, L4 and L2 is only 61.2%. Consequently, the mean broadcasting latency of a broadcast packet within the switched network is very high.

Similarly, if the node N2 wishes to send on a broadcast packet coming from the node 1 through the link L2, it must wait for the simultaneously availability of the links L3 and L5.

On the contrary, the tree of the invention (see FIG. 6) takes account of the number of links per node contained in the spanning tree. In the example shown, the tree of the invention is linear. This means that a source node, at the origin of the broadcasting of a broadcast packet, must await the simultaneous availability of two of its output ports at most. This also means that an intermediate node, that forwards a broadcast packet that it has received to other nodes, must forward the broadcast packet on only one of its output ports. Thus, the chances of the simultaneous availability of the output ports concerned by the broadcasting is increased and the mean broadcasting latency of a broadcast packet within the switched network is reduced.

Figure 7:
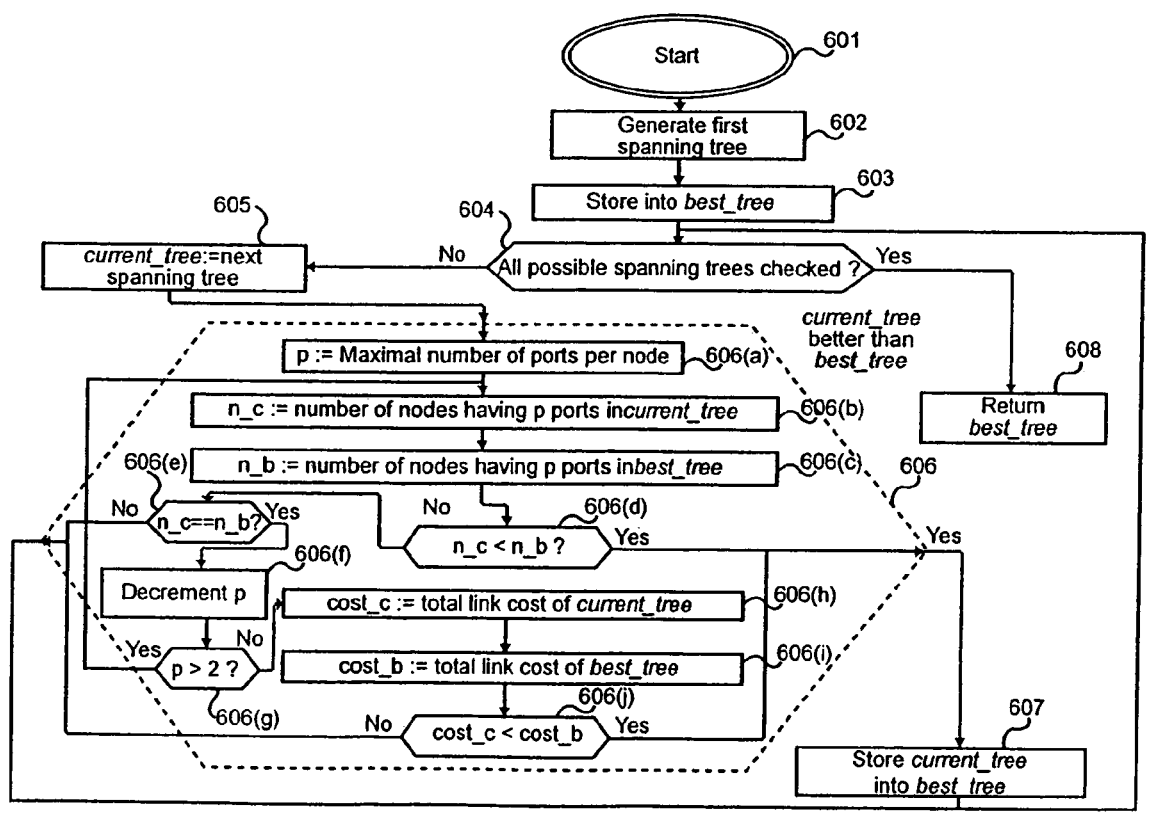
FIG. 7 is a flow chart describing an exemplary algorithm for the calculation of the spanning tree according to the invention.

Referring to FIG. 7, a flow chart is now presented describing an exemplary algorithm for the calculation of a spanning tree according to the invention.

In this exemplary algorithm, all the possible spanning trees are generated systematically in order to ascertain which is the tree that best meets the criterion according to the invention (minimizing of the number of links per node in the spanning tree).

If we assume that the link has N nodes and L links, each spanning tree comprises L−1 links and there are M different spanning trees with:

$$M = C_{N-1}^{L} = \frac{L!}{(N-1)!(L-N+1)!}$$

All these trees may be generated simply by generating all the subsets of the N−1 elements of the set of all of the links and by eliminating the subsets that are not trees.

Consequently, it is possible to generate all the trees and process them simultaneously as is done during the steps referenced 602 (generation of the first tree), 605 (passage to the next tree) and 604 (verification that all the trees have been processed).

As explained in detail here below, the following variables are used in particular:

the "best_tree" variable to store the set of links representing the tree that best meets the criterion according to the invention;

the "current_tree" variable to store the set of links representing a tree to be compared with the best_tree.

A description shall now be given of the running of the exemplary algorithm shown in FIG. 7.

After the execution of the algorithm (step 601) has been launched, a first spanning tree (step 602) is generated and is stored in the "best_tree" variable (step 603).

If all the possible spanning trees have been processed (response "yes" to the question of step 604), the final result of the algorithm consists of the contents of the "best_tree" variable (step 608).

If not (response "no" to the question of step 604), the following tree is generated and stored in the "current_tree" variable (step 605) in order to compare it with the tree stored in the variable "best_tree" (step 606):

if the tree contained in the "current_tree" variable is "better" than the one contained in the "best_tree" variable (response "yes" to the question of step 606), the contents of the "best_tree" variable are replaced by those of the "current_tree" variable (step 607) before looping back to the step 604 (i.e. the question: have all the possible spanning trees been checked ?);

if not (response "no" to the question of step 606), the contents of the "best_tree" variable are not modified and there is a direct loop back to the step 604.

We shall now present a preferred embodiment of the step referenced 606 seeking to determine if the tree contained in the "current_tree" variable is "better" than the one contained in the "best_tree" variable:

the predetermined maximum number of ports per node is assigned to a variable "p" (step 606(*a*)). In the example illustrated in FIG. 6, p=3;

to a variable "n_c", there is assigned the number of nodes having p ports in the tree contained in the "current_tree" variable (step 606(*b*));

to a variable "n_b" there is assigned the number of nodes having p ports in the tree contained in the "best_tree" variable (step 606(*c*));

the contents of the variables "n_c" and "n_b" (step 606(*d*) and 606(*e*)) are compared;

if "n_c"<"n_b" (response "yes" to the question of step 606(*d*)) then the response to the question of the step referenced 606 is "yes" (the tree contained in the "current_tree" variable is "better" than the one contained in the "better_tree" variable) and there is a loop back to the step referenced 607;

if "n_c"<"n_b" (response "no" to the question of step 606(*d*) and "no" to the question of step 606(*e*)), then the response to the question of the step referenced 606 is "no" (the tree contained in the "current_tree" variable is not "better" than the one contained in the "best_tree" variable) and there is a loop back to the step referenced 604;

if "n_c"="n_b" (responses "no" to the question of step 606(*d*) and "yes" to the question of the step 606(*e*)), then the response to the question of the step referenced 606 is not immediate and the following steps have to be performed:

the variable "p" is incremented by one unit (step 606(*f*));

if p>2 (response "yes" to the question of step 606(*g*)), the steps referenced 606(*b*), 606(*c*) and 606(*d*) are repeated with the value decremented by "p";

else (response "no" to the question of step 606(*g*)), the two trees contained in the "current_tree" and "best_tree" variables respectively are compared with at least one other criterion (see below steps referenced 606(*h*), 606(*i*) and 606(*j*)).

In the example illustrated in FIG. 7, this other criterion is the standard criterion for the minimization of the total load of the links belonging to the tree. Its application runs as follows.

to a "cost_c" variable, there is assigned the total cost of the links of the tree contained in the "current_tree" variable (step 606(*h*));

to a "cost_b" variable, there is assigned the total cost of the links of the tree contained in the "best_tree" variable (step 606(*i*));

the contents of the "cost_c" and "cost_b" variables are compared (step 606(*j*));

if "cost_c"<"cost_b", then the response to the question of the step referenced 606(*j*) (and therefore that of the question referenced 606) is "yes" (the tree contained in the "current_tree" variable is "better" than the one contained in the "best_tree" variable) and there is a loop back to the step referenced 607;

if "cost_c"≧"cost_b", then the response to the question of the step referenced 606(*j*) (and therefore that of the question referenced 606) is "no" (the tree contained in the "current_tree" variable is not "better" than the one contained in the "better_tree" variable) and there is a loop back to the step referenced 604.

What is claimed is:

1. A method for transmitting a broadcast packet within a switched network comprising a plurality of nodes interconnected by a plurality of links, said broadcast packet being transmitted along a spanning tree, wherein the method comprises the steps of:

generating a plurality of possible spanning trees of the network adapted to broadcast the broadcast packet;

selecting among said determined spanning trees a spanning tree having:

the smallest reference number (p), wherein a reference number for a given spanning tree is defined as the maximum number of links associated to a node which are included in said given spanning tree, and wherein the links associated to a node are the links to which said node is simultaneously transmitting said broadcast packet; and the smallest number of nodes (n_b) having a number of associated links included in the spanning free equal to said smallest reference number; and transmitting said broadcast packet according to the selected spanning tree.

2. A method according to claim 1, wherein said step of selecting consists in the selection of a linear spanning tree in which there are at most two links connected to each node.

3. A method according to claim 1, wherein the step of generating pertains to all the possible spanning trees.

4. A method according to claim 1, wherein said step of selecting the spanning tree comprises a step of comparing the plurality of spanning trees, said step of comparing comprising the following steps:

(a) the number of nodes with p associated links for one of the spanning trees is compared with the number of nodes with p associated links for the other spanning trees, with p being the predetermined maximum number of links that can be connected to a node for said switched network;

(b) if one of the spanning trees has fewer nodes with p associated links, it is selected as the spanning tree to broadcast the broadcast packet;

(c) if the spanning trees have the same number of nodes with p associated links, a complementary processing operation is applied.

5. A method according to claim 4, wherein said complementary processing consists of the decrementing of p by one unit and then:

if p>2, the steps (a), (b) and (c) are reiterated with the decremented value of p;

else, the step of selecting a spanning tree is performed according to another criterion that depends on the total load of the links which are included in the spanning tree.

6. A method according to claim 1, wherein said selecting among said determined spanning trees is performed dynamically only after each modification of the topology of the network.

7. A computer program, stored on a computer readable medium, comprising sequences of instructions adapted to the implementation of a method according to claim 1, when said program is executed on a computer.

8. A data packet switch apparatus, of a type contained in a node and capable of participating in implementation of a method for transmitting of a broadcast packet, within a switched network comprising a plurality of nodes interconnected by a plurality of links, said broadcast packet being transmitted along a spanning tree of the network wherein said switch apparatus comprises:

means for generating a plurality of possible spanning trees of the network adapted to broadcast the broadcast packet;

means for sending said broadcast packet simultaneously on several links;

means for selecting among said determined spanning trees a spanning tree having:

the smallest reference number (p), wherein a reference number for a given spanning tree is defined as the maximum number of links associated to a node which are included in said given spanning tree, and wherein the links associated to a node are the links to which said node is simultaneously transmitting said broadcast packet; and the smallest number of nodes (n_b) having a number of associated links included in the spanning tree equal to said smallest reference number; and means for memorizing those links, among the links connected to the switch apparatus, that have to be used during the broadcasting of a packet.

9. A data packet switch apparatus according to claim 8, further comprising means for storing data packets to be broadcasted, the means for storing data packets being a single Fifo.

10. A data packet switch apparatus according to claim 9, wherein the data packet switch apparatus comprises means enabling transfer of packets contained in the means for storing simultaneously to output Fifo.

11. A data packet switch apparatus according to claim 8, further comprising means for storing data packets to be broadcasted, the means for storing data packets being of Fifo type.

12. A data packet switch apparatus according to claim 8, wherein the means for simultaneously sending of said broadcast packet simultaneously on several links comprises two internal buses;

one internal bus for the transmission of the broadcast packet to said associated links; and one internal bus for the transmission of the broadcast packet to an internal link.

* * * * *